United States Patent
Mathiszik et al.

(10) Patent No.: US 8,055,448 B2
(45) Date of Patent: Nov. 8, 2011

(54) IMAGING OF FORMATION STRUCTURE AHEAD OF THE DRILL-BIT

(75) Inventors: Holger Mathiszik, Eicklingen (DE); Tim W. Geerits, Houston, TX (US); Thomas Bohlen, Brügge (DE); Denise De Nil, Freiberg (DE); Daniel Köhn, Freiberg (DE); Olaf Hellwig, Nossen (DE); Stefan Jetschny, Dresden (DE)

(73) Assignee: Baker Hughes Incorporated, Houston, TX (US)

( * ) Notice: Subject to any disclaimer, the term of this patent is extended or adjusted under 35 U.S.C. 154(b) by 526 days.

(21) Appl. No.: 12/139,179

(22) Filed: Jun. 13, 2008

(65) Prior Publication Data
US 2008/0312839 A1    Dec. 18, 2008

Related U.S. Application Data

(60) Provisional application No. 60/944,373, filed on Jun. 15, 2007.

(51) Int. Cl.
*G06V 1/40* (2006.01)
(52) U.S. Cl. .................. 702/11; 175/45; 367/38; 702/6; 702/7
(58) Field of Classification Search .................. 702/6, 7, 702/11, 18, 48, 71, 73, 75; 367/38, 57, 82; 175/45; 340/854.4; 181/104
See application file for complete search history.

(56) References Cited

U.S. PATENT DOCUMENTS

| | | | |
|---|---|---|---|
| 4,683,557 A | 7/1987 | Willis | |
| RE35,389 E | 12/1996 | Kleiner | |
| 5,678,643 A | 10/1997 | Robbins et al. | |
| 5,726,951 A * | 3/1998 | Birchak et al. | 367/38 |
| 6,084,826 A | 7/2000 | Leggett, III | |
| 6,166,994 A | 12/2000 | Jeffryes | |
| 6,176,344 B1 | 1/2001 | Lester | |
| 6,850,168 B2 | 2/2005 | Tang et al. | |
| 7,063,174 B2 | 6/2006 | Chemali et al. | |
| 2003/0167835 A1 | 9/2003 | Sinha et al. | |
| 2004/0059512 A1 | 3/2004 | Thomann et al. | |
| 2006/0034152 A1 | 2/2006 | Korneev | |

FOREIGN PATENT DOCUMENTS
WO   WO0127657 A1   4/2001

OTHER PUBLICATIONS

E. Blias; VSP Wavefield Separation. Wave-By-Wave Approach., SEG/Houston 2005 Annual Meeting, pp. 2609-2613.

* cited by examiner

*Primary Examiner* — John H Le
(74) *Attorney, Agent, or Firm* — Mossman, Kumar & Tyler, P.C.

(57) ABSTRACT

A downhole acoustic logging tool is used for generating a guided borehole wave that propagates into the formation as a body wave, reflects from an interface and is converted back into a guided borehole wave. Guided borehole waves resulting from reflection of the body wave are used to image a reflector.

21 Claims, 12 Drawing Sheets

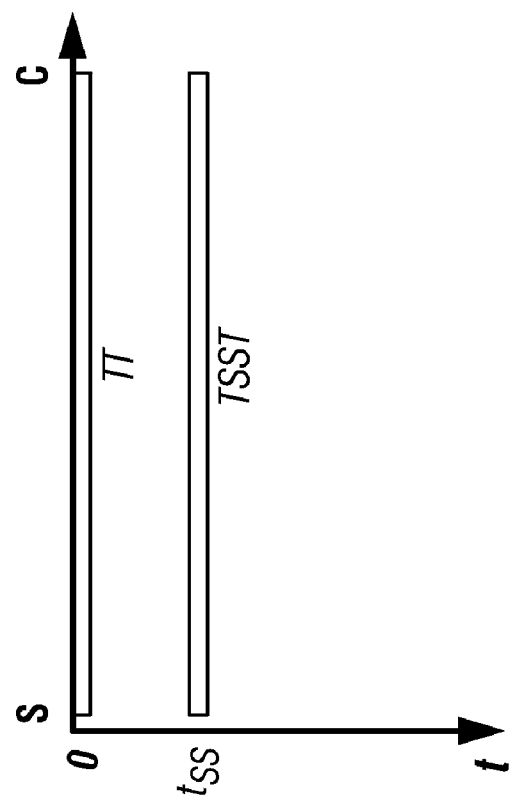
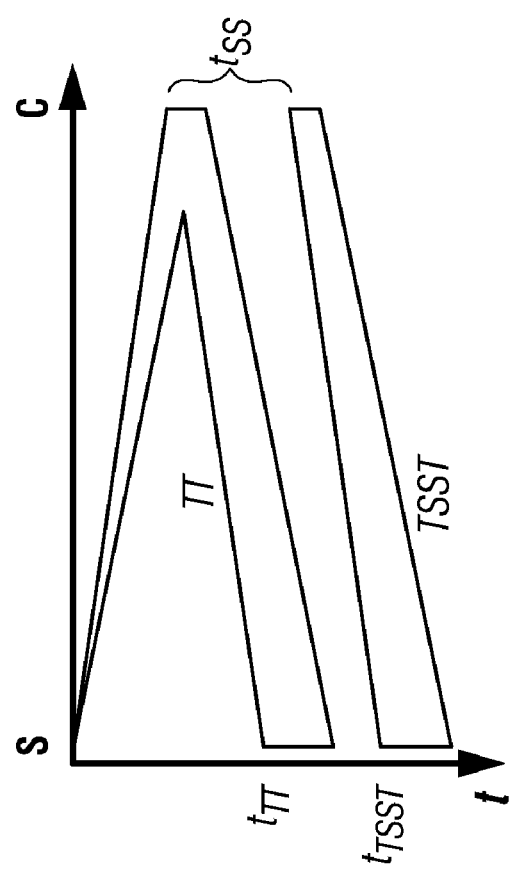
FIG. 12

IMAGING OF FORMATION STRUCTURE AHEAD OF THE DRILL-BIT

CROSS-REFERENCES TO RELATED APPLICATIONS

This application claims priority from U.S. Provisional Patent Application Ser. No. 60/944,373 filed on Jun. 15, 2007.

BACKGROUND OF THE DISCLOSURE

1. Field of the Disclosure

The present disclosure pertains to logging while drilling apparatus and more particularly to acoustic logging while drilling apparatus and generating and using guided waves to look ahead of the drillbit.

2. Summary of the Related Art

To obtain hydrocarbons such as oil and gas, wells or wellbores are drilled into the ground through hydrocarbon-bearing subsurface formations. Currently, much current drilling activity involves not only vertical wells but also drilling horizontal wells. In drilling, information from the well itself must be obtained. While seismic data has provided information as to the area to drill and approximate depth of a pay zone, the seismic information can be not totally reliable at great depths. To support the data, information is obtained while drilling through logging while drilling or measuring while drilling (MWD) devices. Logging-while-drilling, or measuring-while-drilling are procedures that have been in use for many years. This procedure is preferred by drillers because it can be accomplished without having to stop drilling to log a hole. This is primarily due to the fact that logging an unfinished hole, prior to setting casing if necessary, can lead to washouts, damaging the drilling work that has already been done. This can stall the completion of the well and delay production. Further, this information can be useful while the well is being drilled to make direction changes immediately. Measurements, however, are taken long after the actual drilling of the well.

An important part of drilling operations is the trying to control the direction of drilling in a desired direction. This requires the ability to "see ahead" of the drillbit. Resistivity methods have been widely used for the purpose but these usually do not have the capability of seeing very far ahead of the drillbit. See, for example, U.S. RE 35389 to Wu et al., U.S. patent application Ser. No. 11/072,027 of Tabarovsky et al., U.S. patent application Ser. No. 11/183,139 of Folberth et al., U.S. patent application Ser. No. 11/489,875 of Wang et al. Formation pressure measurements have been used as in U.S. Pat. No. 7,063,174 to Chemali et al. The present disclosure deals with an acoustic method of looking ahead of the drillbit. For other examples using acoustic measurements, see U.S. Pat. No. 6,166,994 to Jeffryes, U.S. Pat. No. 5,678,643 to Robbins et al., U.S. Pat. No. 6,084,826 to Leggett et al., WO01/27657 of Kroode et al., and US 2004/0059512 of Thomann et al.

SUMMARY OF THE DISCLOSURE

One embodiment of the disclosure is a method of determining a distance to an interface in the earth formation. The method includes conveying a logging instrument into a borehole, activating at least one transmitter on the logging instrument to produce a guided acoustic wave which propagates downward to the bottom of the borehole and produces an acoustic wave in the formation. The method further includes using at least one receiver on the logging instrument to record a first signal responsive to the downward propagating guided acoustic wave, and record a second signal responsive to an upward propagating guided acoustic wave resulting from reflection of the acoustic wave in the formation at an interface therein. A distance to the interface is estimated from the first signal and the second signal, and recorded on a suitable medium. The method may further include estimating a dip angle and an azimuth of the interface. The guided acoustic wave may be a Stoneley wave or a quadrupole wave. The method may further include activating the at least one transmitter with a frequency determined at least in part by a characteristic frequency of the guided wave. The acoustic wave in the formation may be a shear wave. Activation of the transmitter may be done in a monopole mode or a quadrupole mode. A wavefield separation may be performed. An image of the interface may be produced. Estimating the distance may be based on applying a dispersion correction to the first signal and/or the second signal. A directional drilling may be controlled using the determined distance.

Another embodiment of the disclosure is an apparatus for determining a distance to an interface in the earth formation. The apparatus includes a logging instrument configured to be conveyed into a borehole. At least one transmitter on the logging instrument is configured to produce a guided acoustic wave which propagates downward to the bottom of the borehole and produces an acoustic wave in the formation. At least one receiver on the logging instrument is configured to record a first signal responsive to the downward propagating guided acoustic wave and record a second signal responsive to an upward propagating guided acoustic wave resulting from reflection of the acoustic wave in the formation at an interface therein. The apparatus also includes a processor configured to estimate from the first signal and the second signal a distance from the bottom of the borehole to the interface, and record the estimated distance on a suitable medium. The at least one processor may be further configured to estimate a dip angle and an azimuth of the interface. The guided acoustic wave may be a Stoneley wave or a quadrupole wave. The at least one transmitter may include a plurality of transmitters axially and/or circumferentially disposed on the logging instrument. The at least one transmitter is configured to be activated at a frequency determined at least in part by a characteristic frequency of the guided wave. The acoustic wave in the formation may be a shear wave. The transmitter may be configured to be activated in a monopole mode or a quadrupole mode. The at least one processor may be further configured to perform a wavefield separation. The processor may be further configured to image the interface. The processor may be further configured to control its direction of drilling using the determined distance. The apparatus also include a conveyance device configured to carry a downhole assembly including the logging instrument and the conveyance device may be a wireline or a drilling tubular.

Another embodiment of the disclosure is a computer-readable medium for use with an apparatus for determining a distance to an interface in an earth formation. The apparatus includes a logging instrument configured to be conveyed into a borehole. At least one transmitter on the logging instrument is configured to produce a guided acoustic wave which propagates downward to the bottom of the borehole and produces an acoustic wave in the formation. At least one receiver on the logging instrument is configured to record a first signal responsive to the downward propagating guided acoustic wave, and record a second signal responsive to an upward propagating guided acoustic wave resulting from reflection of the acoustic wave in the formation at an interface therein. The medium includes instructions which enable a processor to estimate from the first signal and the second signal a distance from the bottom of the borehole to the interface, and record the estimated distance on a suitable medium. The medium may include a ROM, an EAROM, an EPROM, an EEPROM, a flash memory, and/or an optical disk.

BRIEF DESCRIPTION OF THE FIGURES

For detailed understanding of the present disclosure, references should be made to the following detailed description of exemplary embodiment(s), taken in conjunction with the accompanying drawings, in which like elements have been given like numerals, wherein:

FIG. 12 shows seismograms with traces recorded between source position (S) and conversion point (C) before (left drawing) and after (right drawing) performing dispersion correction and travel time reduction: the TSST-wave is imaged at the travel time $t_{SS}$, which corresponds to the distance between conversion point and reflector;

DETAILED DESCRIPTION OF THE EMBODIMENTS

In view of the above, the present disclosure through one or more of its various aspects and/or embodiments is presented to provide one or more advantages, such as those noted below.

Figure 1:
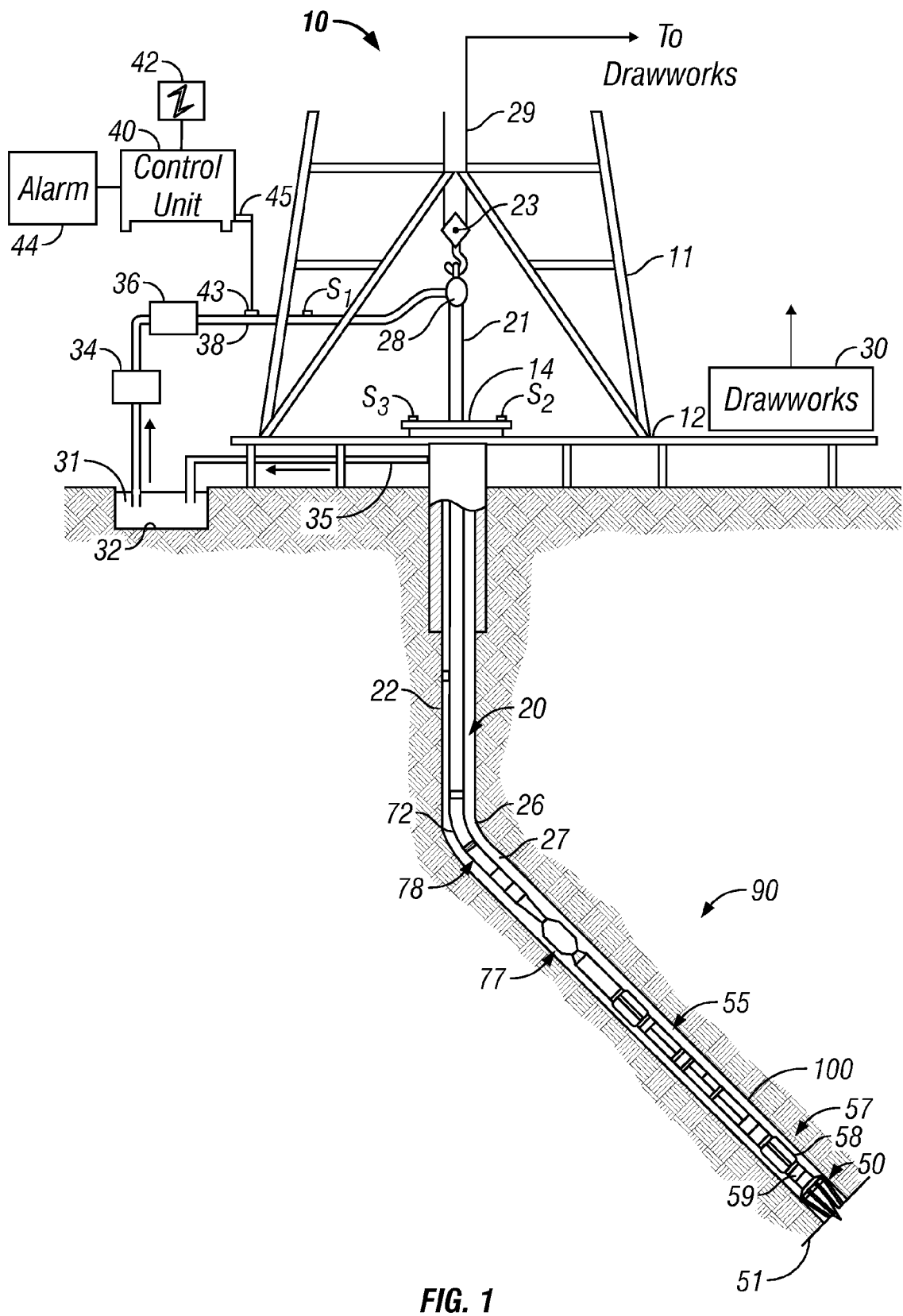
FIG. 1 is an illustration of a bottomhole assembly (BHA) deployed in a borehole from a drilling tubular that includes the apparatus according to one embodiment of the present disclosure.

FIG. 1 illustrates a schematic diagram of an MWD drilling system 10 with a drill string 20 carrying a drilling assembly 90 (also referred to as the bottom hole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drill string 20 includes tubing such as a drill pipe 22 or a coiled-tubing extending downward from the surface into the borehole 26. The drill string 20 is pushed into the wellbore 26 when a drill pipe 22 is used as the tubing. For coiled-tubing applications, a tubing injector (not shown), however, is used to move the tubing from a source thereof, such as a reel (not shown), into the wellbore 26. The drill bit 50 attached to the end of the drill string 20 breaks up the geological formations when it is rotated to drill the borehole 26. If a drill pipe 22 is used, the drill string 20 is coupled to a drawworks 30 via a Kelly joint 21, swivel 28 and line 29 through a pulley 23. During drilling operations, the drawworks 30 is operated to control the weight on bit, a parameter that affects the rate of penetration. The operation of the drawworks is well known in the art and is thus not described in detail herein.

During drilling operations, a suitable drilling fluid 31 from a mud pit (source) 32 is circulated under pressure through a channel in the drill string 20 by a mud pump 34. The drilling fluid passes from the mud pump 34 into the drill string 20 via a desurger 36, fluid line 38 and Kelly joint 21. The drilling fluid 31 is discharged at the borehole bottom 51 through openings in the drill bit 50. The drilling fluid 31 circulates uphole through the annular space 27 between the drill string 20 and the borehole 26 and returns to the mud pit 32 via a return line 35. The drilling fluid acts to lubricate the drill bit 50 and to carry borehole cutting or chips away from the drill bit 50. A sensor S1 preferably placed in the line 38 provides information about the fluid flow rate. A surface torque sensor S2 and a sensor S3 associated with the drill string 20 respectively provide information about the torque and rotational speed of the drill string. Additionally, a sensor (not shown) associated with line 29 is used to provide the hook load of the drill string 20.

Rotating the drill pipe 22 rotates the drill bit 50. Also, a downhole motor 55 (mud motor) may be disposed in the drilling assembly 90 to rotate the drill bit 50 and the drill pipe 22 is rotated usually to supplement the rotational power, if required, and to effect changes in the drilling direction.

In the embodiment of FIG. 1, the mud motor 55 is coupled to the drill bit 50 via a drive shaft (not shown) disposed in a bearing assembly 57. The mud motor 55 rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

A drilling sensor module 59 is placed near the drill bit 50. The drilling sensor module 59 contains sensors, circuitry and processing software and algorithms relating to the dynamic drilling parameters. Such parameters may include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module 59 processes the sensor information and transmits it to the surface control unit 40 via the telemetry system 72.

The communication sub 72, a power unit 78 and an NMR tool 79 are all connected in tandem with the drill string 20. Flex subs, for example, are used in connecting the MWD tool 77 in the drilling assembly 90. Such subs and tools form the bottom hole drilling assembly 90 between the drill string 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals may be processed using a downhole processor in the drilling assembly 90.

The surface control unit or processor 40 also receives signals from other downhole sensors and devices, signals from sensors S1-S3 and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 preferably includes a computer or a microprocessor-based processing system, memory for storing programs or models and data, a recorder for recording data, and other peripherals. The control unit 40 is preferably adapted to activate alarms 44 when certain unsafe or undesirable operating conditions occur. An acoustic logging tool 100 (discussed next) may be positioned at a suitable location such as shown.

Figure 2:
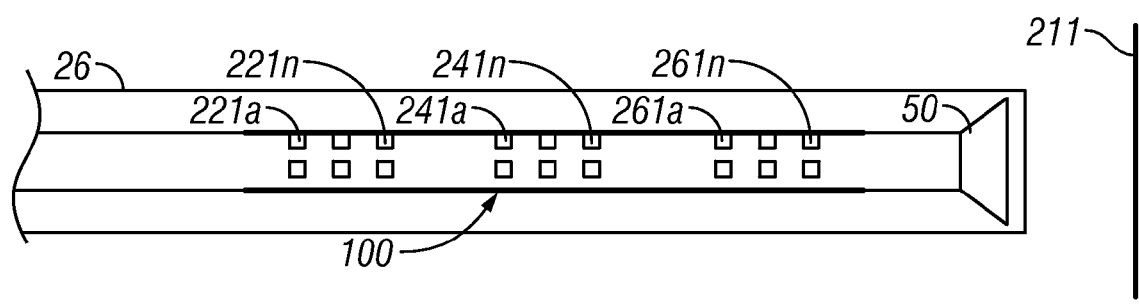
FIG. 2 is an illustration of an exemplary configuration of transmitters and receivers in the present disclosure.

Turning now to FIG. 2, an exemplary tool 100 using the method of the present disclosure is illustrated. As would be known to those versed in the art, a downhole acoustic source (or receiver) has a finite length. The source may consist of several segments stacked in the tool axial direction. This may be referred to as a transmitter assembly. In one embodiment of the disclosure, the elements are piezoelectric transducers.

Shown in FIG. 2 are a first array 221a . . . 221n of receivers and a second array 261a . . . 261n of receivers symmetrically disposed about an array 241a . . . 241n of transmitters. The arrays may include elements that are axially and/or circumferentially disposed. While the illustration shows them on a single housing, this is not to be construed as a limitation to the disclosure; a common configuration uses transmitters and receivers on more than one sub. Also shown in the figure is the borehole 26, the drillbit 50 and a reflector 211. The reflector corresponds to an interface where there is a change in impedance of the formation, so that incident waves would be reflected back.

A novel feature of the present disclosure is the fact that it takes advantage of guided waves generated by an acoustic transducer in a borehole. The following terms are defined for the purposes of this disclosure.

A guided wave is any type of wave that is propagated along a borehole that involves coupled motion of the fluid in the borehole and the borehole wall.

A Stoneley wave is a surface wave at a solid-fluid interface. In the context of the present disclosure, a Stoneley wave propagating along the borehole is a guided wave.

A tube wave is a low-frequency limit of a Stoneley wave in a cylindrical geometry such as a borehole.

Prior art methods treat these guided waves, and Stoneley waves in particular, as undesirable noise and go to great lengths to avoid generating these guided waves and to filter them out of received signals. In the present disclosure, each source element may be tuned in a way to reach maximum output at a specific center frequency to maximize the generation of these guided waves. If such a tuning is not feasible, different source modules with different center frequencies could be deployed. If more than one source is used, the distance between sources is directly related to the applied frequencies (orders of wavelengths) so interference and beam steering becomes feasible. A coupling of all/some source elements directly to the formation by means of pad devices or similar is optional. Source elements could be piezoelectric, piezoceramic, magnetostrictive, or other impulsive or swept frequency devices.

This variety of source center frequencies and locations enables the generation of a maximal amount of guided wave energy in monopole, dipole, quadrupole or higher order excitations. To be specific, Stoneley waves are generated very well by monopole excitation. Quadrupole excitation as described in U.S. Pat. No. 6,850,168 to Tang et al. produces a guided wave that involves coupled formation and fluid motion that travels at close to the shear velocity of the formation.

Having multiple sources axially distributed in the drillstring enables the performance of a multi-offset measurement (variable source-receiver and source-reflector distance) in one run. With only one source in the drillstring this could be achieved by repetitive measurements while drilling ahead only. Mapping the same reflector with changing source-reflector distances as well as having varying source-receiver offsets is beneficial for a proper data evaluation.

Each receiver is tuned to meet exactly the characteristics of the used source. In case different source modules are used, different receiver modules (with receiving characteristics matching the respective source characteristics) need to be applied as well. The spatial arrangement (circumferential and axial) of the receivers is influenced by the maximum source frequency and the excitation mode. For lower frequencies different sensor elements might be connected in parallel. Sensor elements could be pressure or motion sensitive devices mounted directly in the BHA or coupled to the formation via pads or similar systems. Different types of sensors and mountings might be applied in parallel to serve various excitation modes simultaneously in one BHA.

Figure 3:
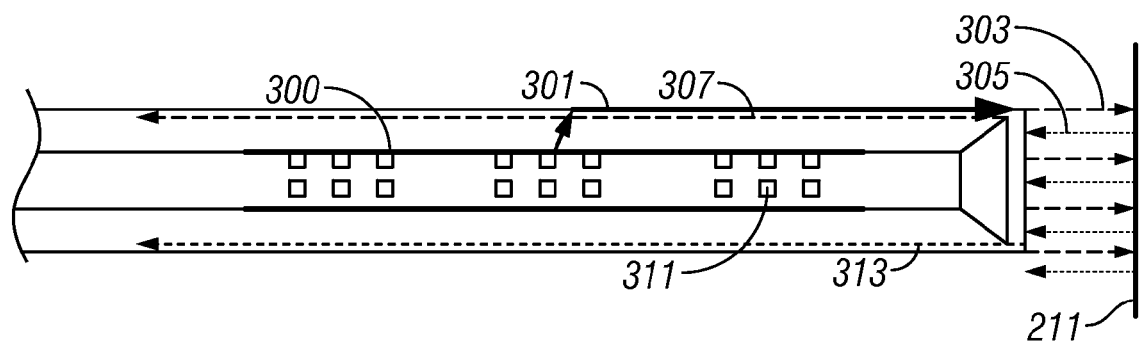
FIG. 3 illustrates schematically the signals that are generated and used in the present disclosure to see ahead of the drillbit.

Turning now to FIG. 3, the basic principle of the present disclosure is illustrated. Activation of a transmitter such as 300 excites a variety of waves in the borehole, the formation and the interface between the borehole and the formation. It is common knowledge that in most instances, the strongest borehole guided wave generated by monopole excitation is a Stoneley wave. The generated Stoneley wave is depicted in FIG. 3 by 301. This guided wave propagates along the borehole. This so-called "direct" guided wave is recorded by receivers such as 311 and used for further processing discussed below. The use of Stoneley waves is not to be construed as a limitation to the disclosure. As noted above, a guided wave may also be produced by quadrupole excitation.

It should be noted that the drillbit does not block the borehole completely, so that much of the direct guided wave does reach the bottom of the borehole. When the guided wave reaches the bottom of the borehole, some of it is reflected back. A significant portion of the guided wave is transmitted into the formation. This is denoted by 303 in the figure.

The downgoing energy 305 is reflected by an interface such as 211, and re-enters the borehole. Upon re-entry into the borehole, much of it converted back into a guided wave (denoted by 207) and propagates up the borehole. The reflected guided wave will have the same characteristics as the direct guided wave, i.e., a Stoneley wave or a quadrupole wave, depending upon the mode of the direct guided wave. This reflected guided wave is also measured by receivers such as 311. The measurements of the direct and reflected guided waves form the basis for imaging ahead of the drillbit.

Figure 4:
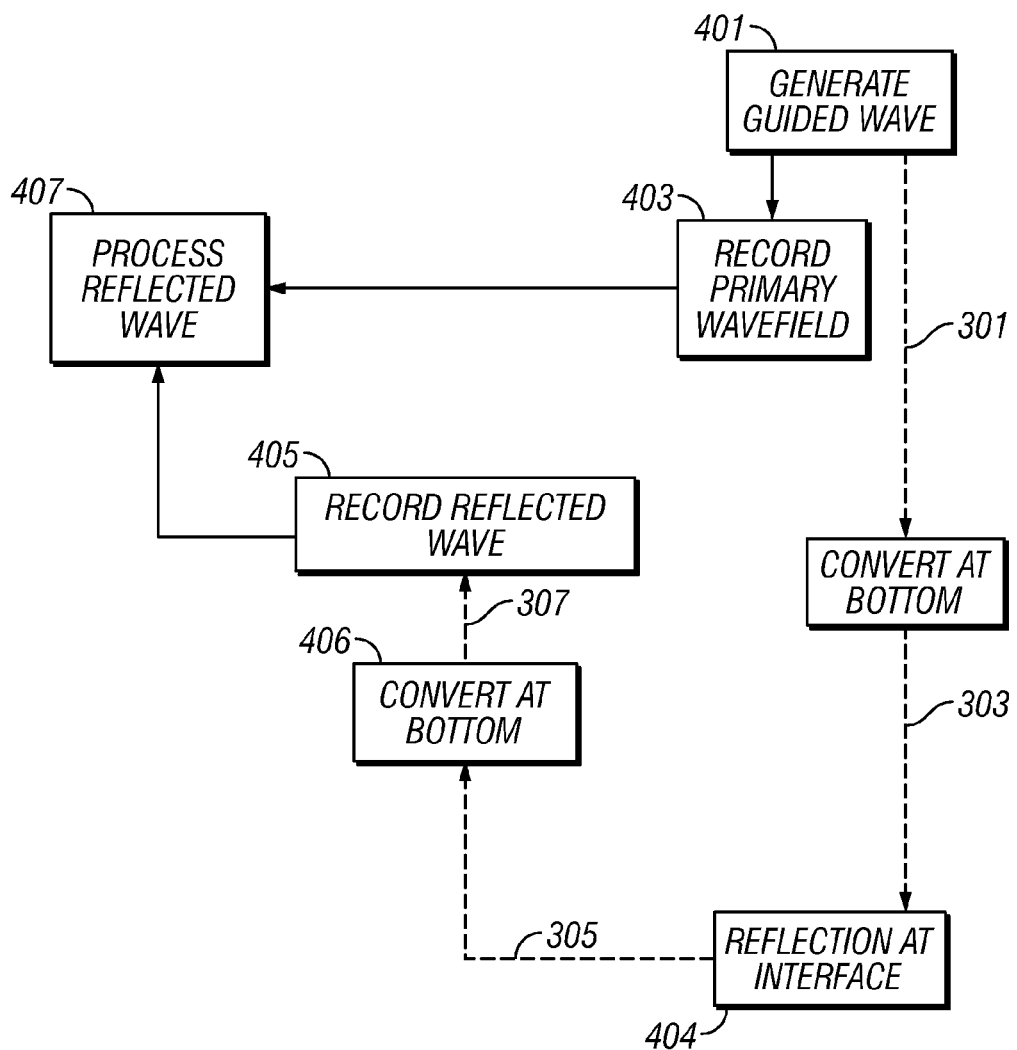
FIG. 4 is a flow chart illustrating some of the methods and physical processes in the present disclosure.

Turning now to FIG. 4, a hybrid flow chart is shown that illustrates the processing steps and the physical processes involved. A guided wave is generated 401 by activating at least one transmitter on the logging tool, and the primary wavefield 301 is recorded 403 by at least one receiver in the receiver array. This may be referred to as a "first signal." At the bottom of the hole, the primary wavefield 301 is partially transmitted 303 as an acoustic wave in the formation, reflected 404 at the interface to produce the reflected wavefield 305 in the formation. The reflected wavefield in the formation is converted at the bottom of the wellbore 406 to produce a reflected guided wave 307 in the borehole that is indicative of the reflecting interface. The reflected guided waves are recorded by the receivers 405. This may be referred to as a "second signal." Also shown in FIG. 3 is a reflection 313 of the primary wavefield at the bottom of the borehole.

Those versed in the art and having benefit of the present disclosure would recognized that since the receiver arrays record both the downgoing guided wave and the upcoming guided wave, conventional wavefield separation methods can be used to separate the guided waves on the basis of the direction of propagation. See, for example, Blias, (2005) SEG Extended Abstracts. Since the distance from the receiver array to the bottom of the borehole is known, using the velocity of the borehole guided wave, it is possible to determine the two-way travel time to the reflector. Alternatively, the two-way travel time to the bottom of the borehole can be determined by the arrival of the reflected wave 313.

The feasibility of the method is studied by means of numerical FD-models. Modeling is performed using the 2.5D FDTD software FDBH by T. Bohlen. It is based on a velocity-stress-formulation of the elastic wave equation in cylindrical coordinates with radius r and depth z as spatial model variables. Although the model is assumed to be constant with azimuth θ, the code does not only allow to model rotation-symmetric wave fields excited by monopole sources, but also wave fields of higher order n with a $\cos(n\theta)$- and $\sin(n\theta)$-dependance, such as dipole (n=1) or quadrupole (n=2) wave fields.

Figure 6:
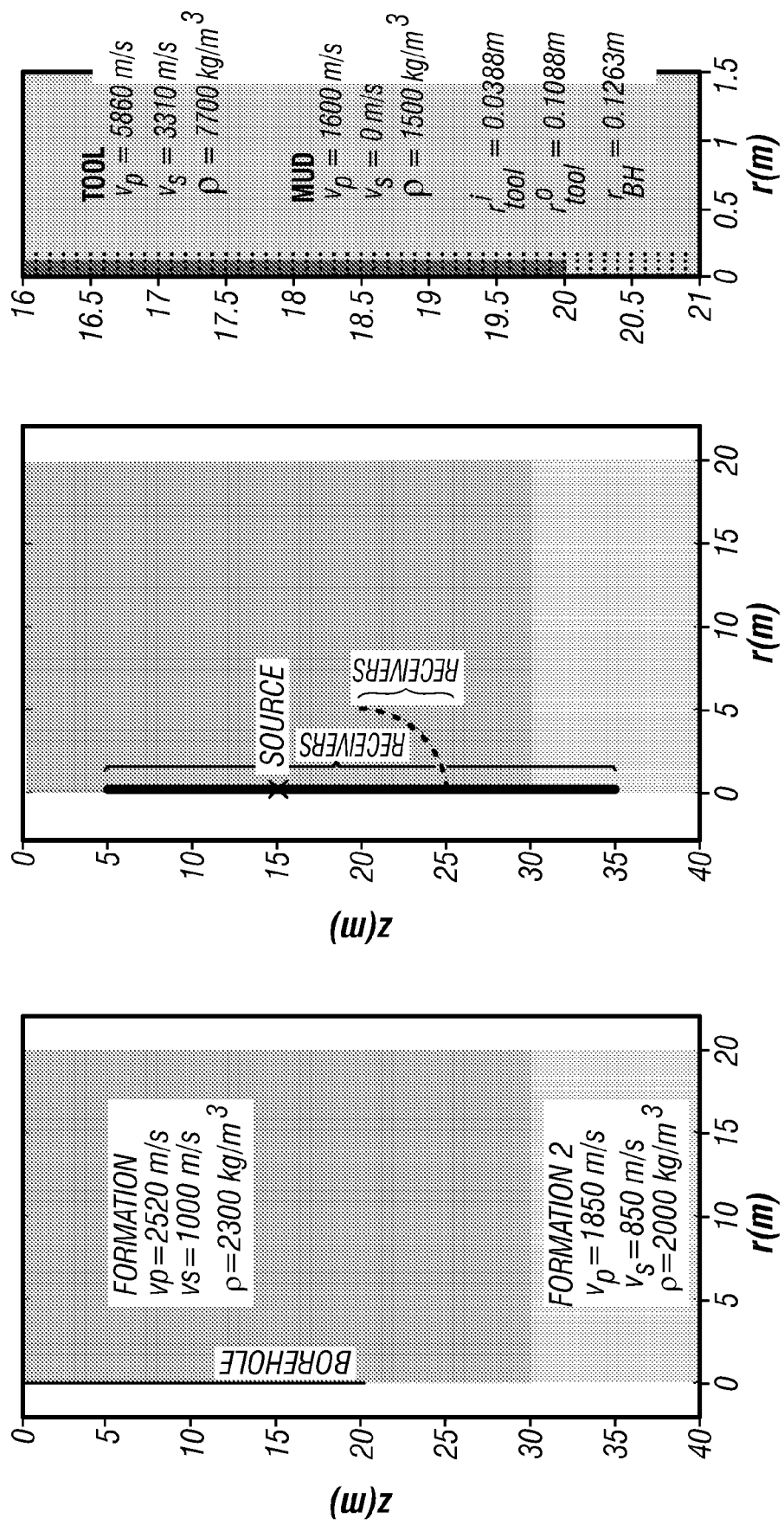
FIG. 6 illustrates the model used to evaluate the method of the present disclosure.

The model comprises a cylindrical fluid-filled borehole with drilling tool in a homogeneous formation. The drilling tool divides the borehole into a central fluid cylinder and a fluid annulus. 10 m ahead of the borehole bottom, perpendicular to the borehole axis, there is a plane reflector. The presented data example contains a dipole volume injection source, which is located within the fluid annulus of the borehole. As source signal, a Ricker wavelet with a center frequency of 5000 Hz is used. The model geometry is given in FIG. 6.

Figure 5:
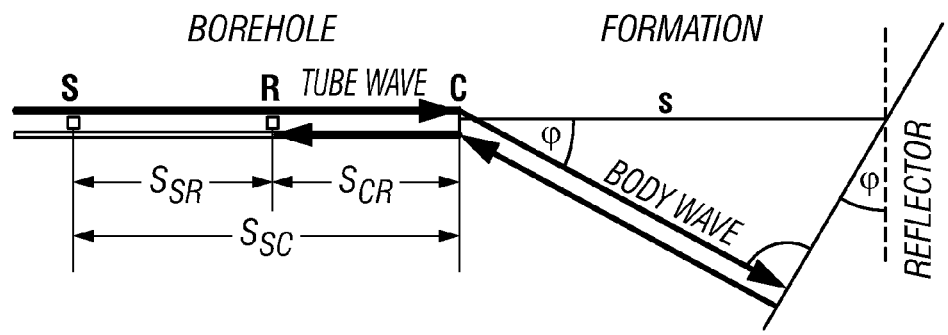
FIG. 5 illustrates the travel paths of the different types of waves involved in the present disclosure.

FIG. 5 illustrates the travel paths of the involved wave types from the source (S) to the receiver (R) and their conversion at the conversion point (C). An advantage of using borehole guided waves is that they are less attenuated by geometrical spreading than body waves. FIG. 5 includes the possibility of the reflector (211 in FIG. 3) being inclined at an angle φ to the tool axis.

Figure 7:
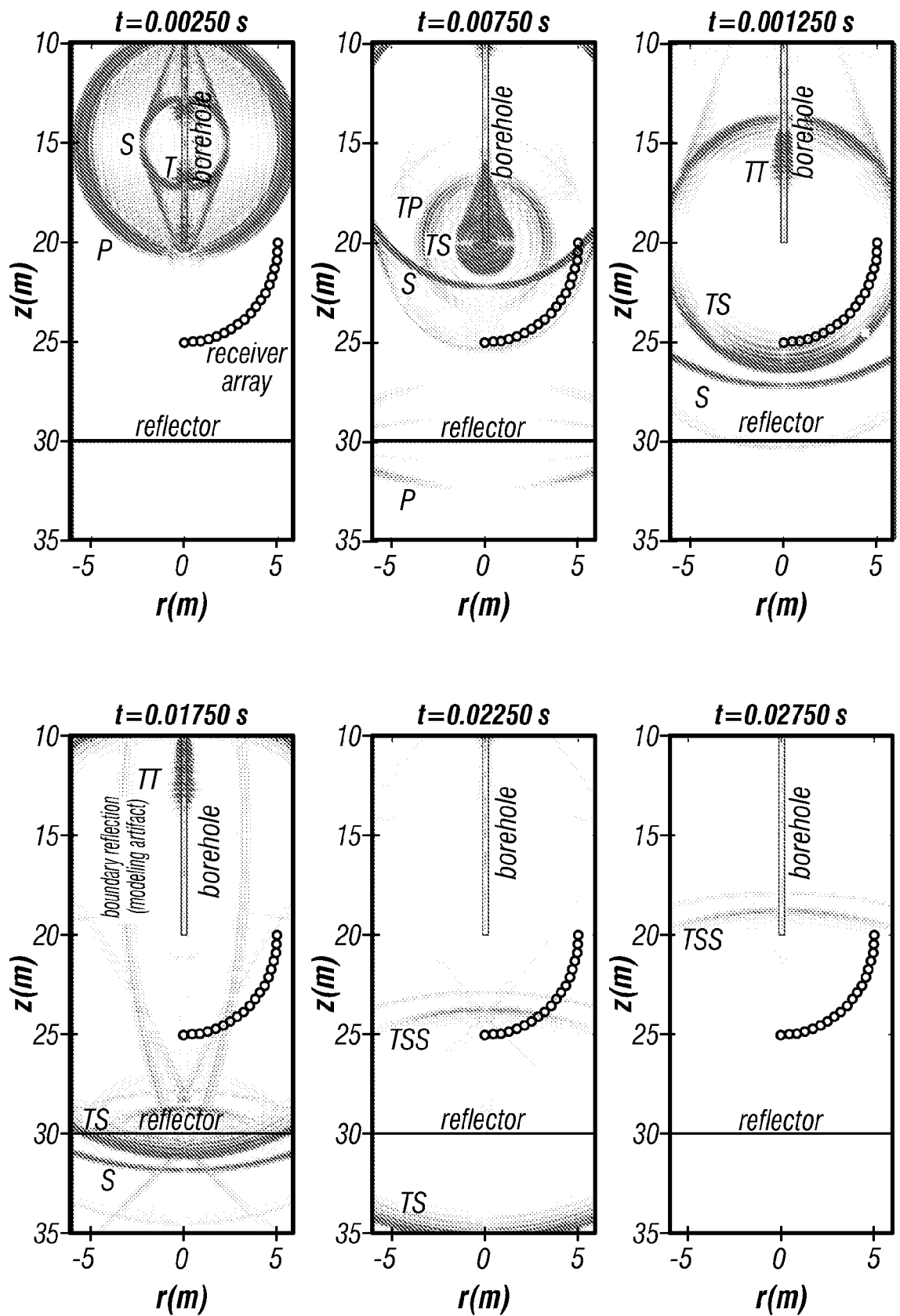
FIG. 7 illustrates snapshots at selected instants of time of the radial component of particle velocity for the model of FIG. 6.

FIG. 7 shows snapshots at different instances of time (2.5 ms, 7.5 ms, 12.5 ms, 17.5 ms, 22.5 ms and 27.5 ms) of the radial component (r-component) of particle velocity. In the figures, the velocities for θ=0° are shown to the right, and the velocities for θ=180° are shown to the left. These snapshots show the propagation of different wave types excited by the model source (P: direct P-wave; S: direct S-wave; T: flexural wave (borehole guided wave excited by a dipole source); TP: flexural wave converted into a P-wave; TS: flexural wave converted into a S-wave; TSS: TS-wave reflected at a layer boundary; TSST: TSS-wave converted into a flexural wave; boundary reflection: modeling artifact, reflection of waves at the model boundary). Note the reflected TSS clearly visible at 22.5 ms and just visible at 17.5 ms.

Figure 10:
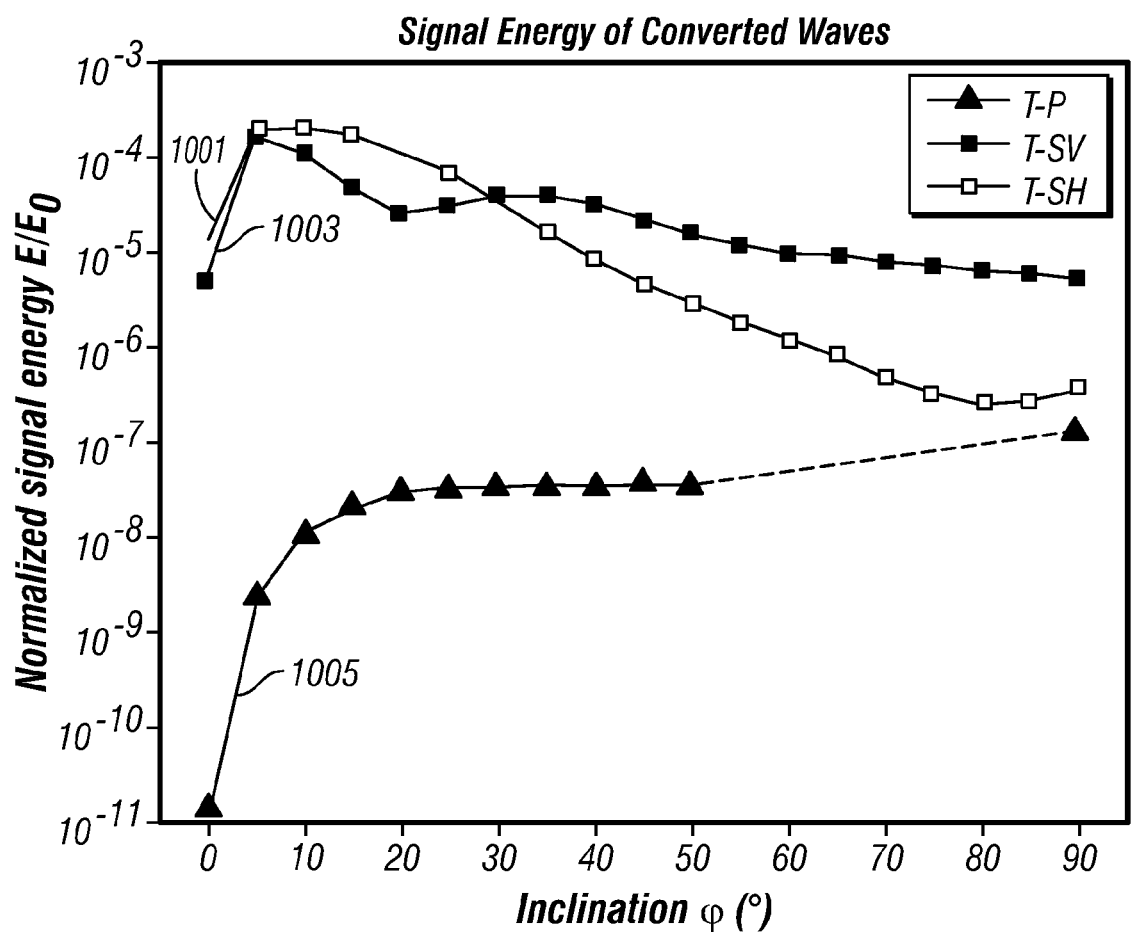
FIG. 10 shows the effectiveness of the conversion at the bottom of the borehole.

The snapshots make clear that the main portion of the flexural wave (T) is converted into S-waves (TS) at the borehole bottom. The conversion characteristic is studied in detail at the receiver positions indicated in FIG. 10. The result is summarized in FIG. 10, which shows the signal energy $$\int_{t_1}^{t_2} \dot{u}^2 dt$$

of converted waves normalized by the signal energy of the flexural wave at one receiver position within the fluid annulus before conversion. The given values of T-P- and T-SV-conversion apply to an azimuth of θ=0°, whereas the values of T-SH-conversion apply to θ=90° due to the mentioned cos $(n\theta)$- and $\sin(n\theta)$-dependance of the corresponding wave field components. SV refers to vertically polarized S-waves and SH refers to horizontally polarized S-waves. FIG. 10 confirms that T-wave to S-wave conversion 1001, 1003 seems to be much more efficient than T-wave to P-wave conversion 1005. The signal energy of both converted wave types differ by orders of magnitude. For this reason, only TSST-waves are considered regarding ahead of drill exploration.

Figure 11:
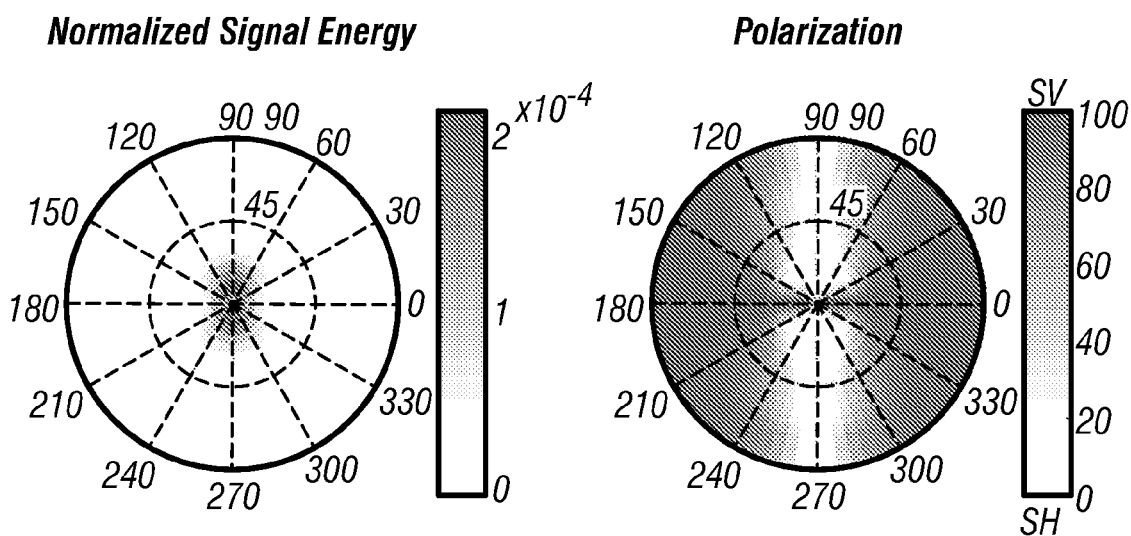
FIG. 11 shows the normalized signal energy of T-S converted waves.

If the azimuthal dependance of T-SV- and T-SH-conversion is taken into account in addition, the directivity of T-S-conversion is obtained as displayed in FIG. 11. It shows the normalized signal energy of T-S-converted waves dependent on their direction of radiation. The middle of the plot corresponds to the direction along the borehole axis (φ=0°). The edge corresponds to the direction perpendicular to the borehole axis (φ=90°), and the circumferential direction corresponds to the azimuth angle θ. The figure shows that the main portion of this converted wave type is radiated at an interval between φ=5° and φ=30°. This angle range depends on the elastic parameters of the formation as well as on the geometry of the borehole and the drill bit in particular. Furthermore, it is evident that the type of the borehole guided wave excited in the borehole and its frequency have an influence on the directivity of the converted waves. If the formation parameters are known, it is possible to direct S-waves from the conversion point (drill bit) in a desired direction by adjusting the source parameters (frequency range, source order), thus targeting at reflectors with a characteristic alignment relative to the borehole.

Figure 8:
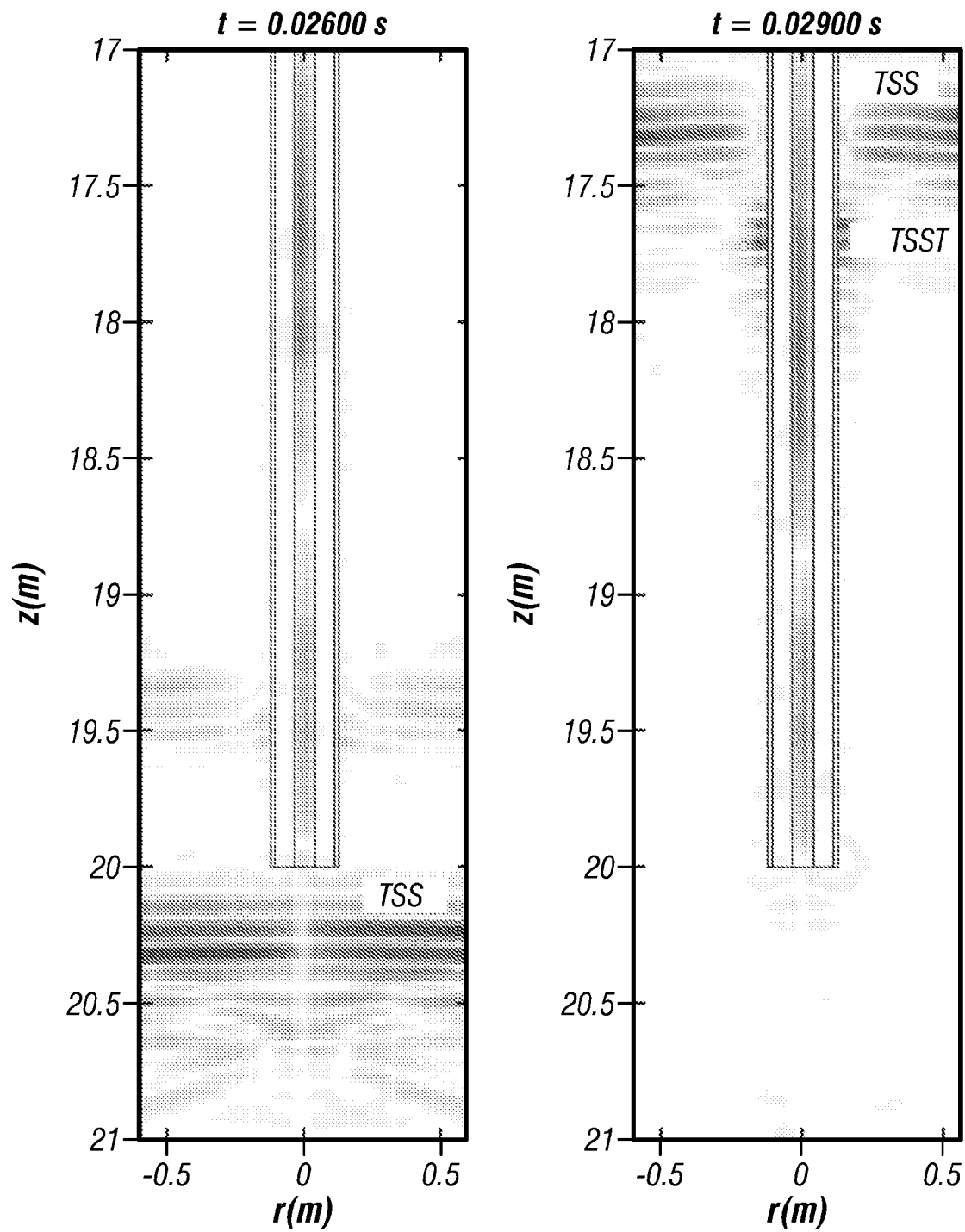
FIG. 8 shows snapshots of the wave field (r-component of particle velocity): Conversion of a S-wave (TSS) into a borehole guided wave (TSST)
Figure 9:
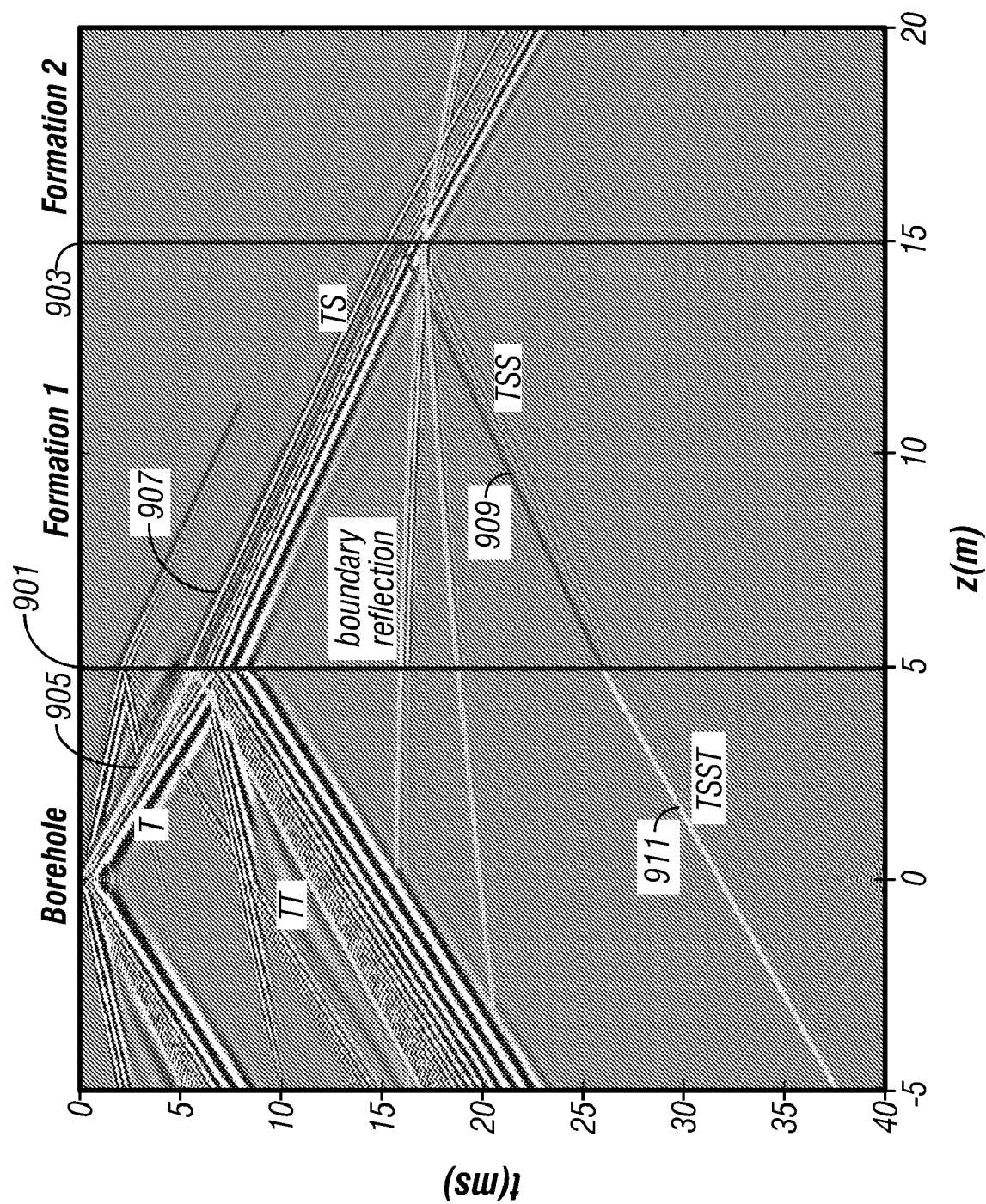
FIG. 9 shows a modeled seismogram (r-component of particle velocity displayed) covering receivers along the borehole and ahead of it with a dipole source, 5000 Hz: Conversion of a flexural wave (T) into a S-wave (TS) at the borehole bottom z=5 m; reflection of the S-wave at a layer interface z=15 conversion of the reflected S-wave (TSS) into a flexural wave (TSST) at the borehole bottom.

The modeled seismogram (FIG. 9) shows the wave field (r-component of particle velocity) along the borehole at r=0.11 m (fluid annulus) and ahead of the borehole within two different types of formation. The line 901 marks the conversion point at the borehole bottom z=5 m and the line 903 marks the layer interface (reflector at z=15 m). Starting at the source position (z=0 m) and t=0 ms, the flexural wave (T), 905 propagates towards the borehole bottom at z=5 m. Although flexural wave to S-wave conversion exhibits a minimum into the direction of the borehole axis (φ=0°; see FIG. 10), conversion into an S-wave (TS), which is indicated by 907, can be observed. Arriving at the reflector at z=15 m, a portion of it is reflected and travels back towards the borehole bottom (TSS) 909. There it excites a flexural wave (TSST) again 911. This can be seen comparing the two snapshots of the wave field (r-component of particle velocity) in FIG. 8. The TSS-wave is approaching at the borehole bottom and continues to travel along the borehole. The excited flexural wave (TSST) is separated from the TSS-wave and guided by the borehole. It propagates at a slightly slower velocity than the S-wave (TSS). Thus it falls back behind the TSS-wave.

To determine the distance of reflectors ahead of the drill, the travel time $t_{TSST}$ of TSST-waves has to be reduced to the travel time $t_{SS}$ of S-waves between the conversion point (borehole bottom) and the reflector. Furthermore, it has to be taken into account that the borehole guided wave (T and TSST) is characterized by dispersion. The signal is stretched and the amplitude of the signal decreases during propagation. The aim is to shift the recorded TSST-signal to the travel time $t_{SS}$ and to reduce the effect of dispersion as sketched in FIG. 12. This figure shows a schematic seismogram section corresponding to receivers between source position (S) and conversion point (C) along the borehole. The borehole guided wave which is reflected at the borehole bottom (TT) has to be shifted to t=0 ms, and the TSST-signal to $t_{SS}$. This can be realized by subtracting $$\frac{s_{SC}}{v(f)} + \frac{s_{CR}}{v(f)}$$

which corresponds to the travel time as borehole guided wave, from $t_{TSST}$. For this purpose, the dispersion characteristic v(f) of the borehole guided wave has to be known.

Travel time reduction and dispersion correction can be applied to the data for each receiver position. It includes a frequency and travel path dependent phase shift, which can be performed in the Fourier domain by multiplication with the factor $$\exp\left(2\pi \cdot i \cdot f\left(\frac{s_{SC}}{v(f)} + \frac{s_{CR}}{v(f)}\right)\right)$$

Figure 13:
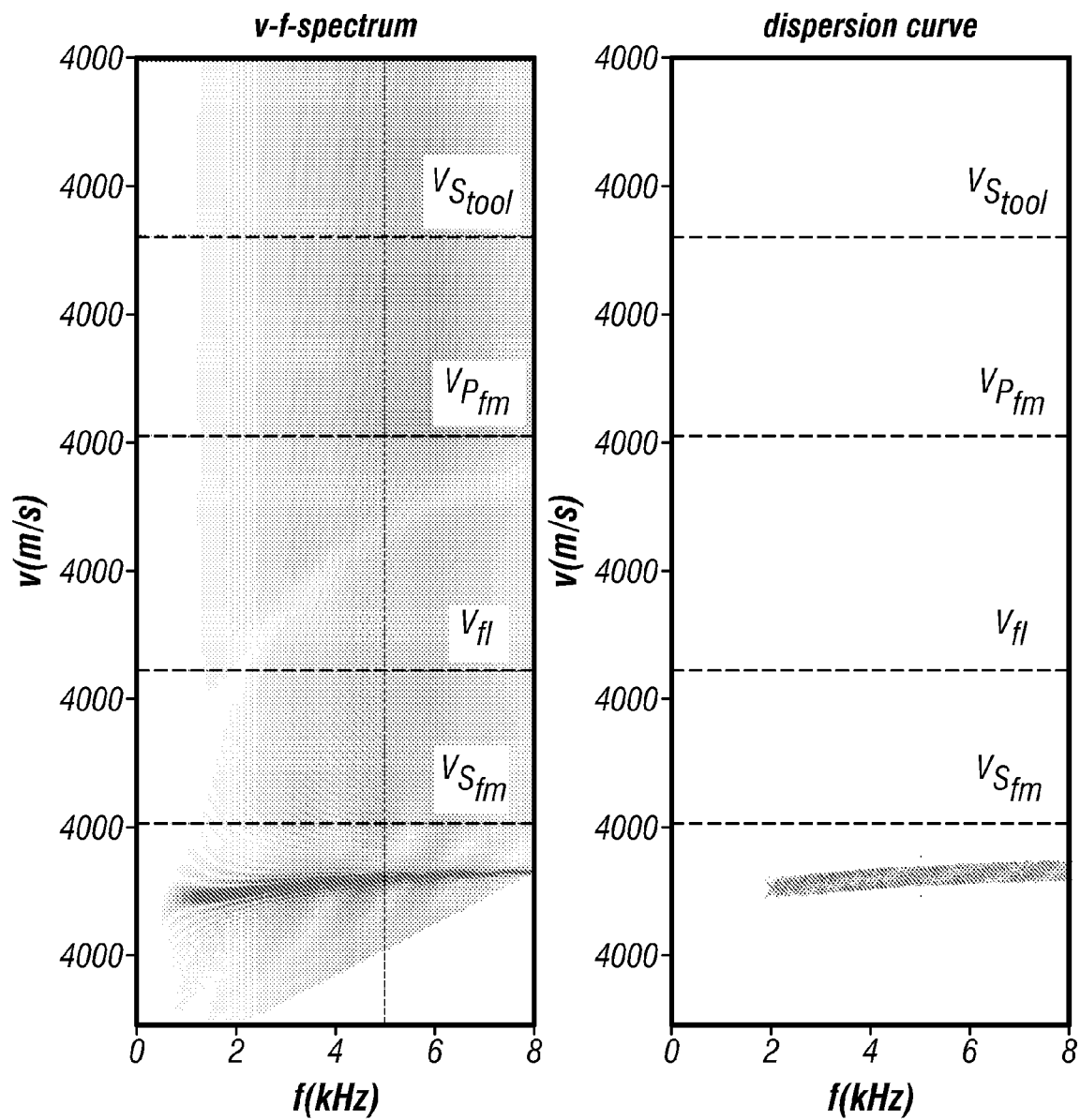
FIG. 13 shows the dispersion curve of the flexural wave (T) in the presented model obtained from the model data.
Figure 14:
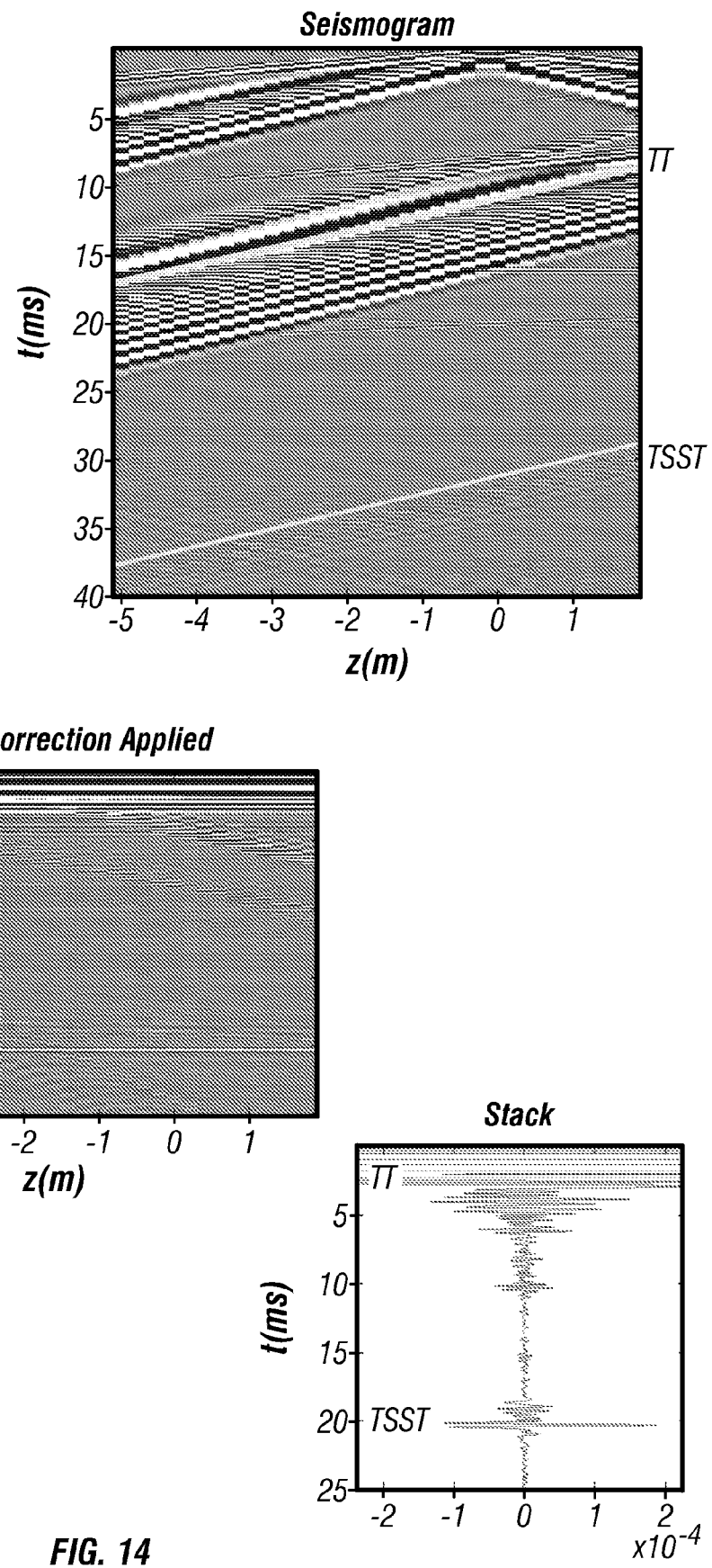
FIG. 14 shows the effect of dispersion correction and travel time reduction applied to a section of seismogram FIG. 9 with 36 traces between z=0.5 m and z=2 m The TSST-signal is imaged at a two-way travel time of at $t_{SS}$=20 ms corresponding to the distance between conversion point and reflector: stacking improves the signal-to-noise ratio significantly.

Subsequent stacking of the resulting traces belonging to different receiver positions improves the signal-to-noise ratio. FIG. 14 shows the successful application of these processing steps to a section of the modeled seismogram of FIG. 9. The chosen seismogram section (a) contains 36 traces within the borehole between z=−5 m and z=2 m. The resulting stack in (c) contains a distinct TSST-signal at $t_{SS}$=20 ms which is caused by the reflector. The dispersion curve of the flexural wave used to compute the dispersion correction in the model is given in FIG. 13.

The obtained travel time $t_{SS}$ corresponds to the travel path s' of the TSST-wave through the formation, which is always perpendicular to the reflector. If the velocity of S-waves $v_s$ in the formation is known, the distance is given by $$s' = \frac{t_{SS}}{2 \cdot v_S}.$$

Figure 15:
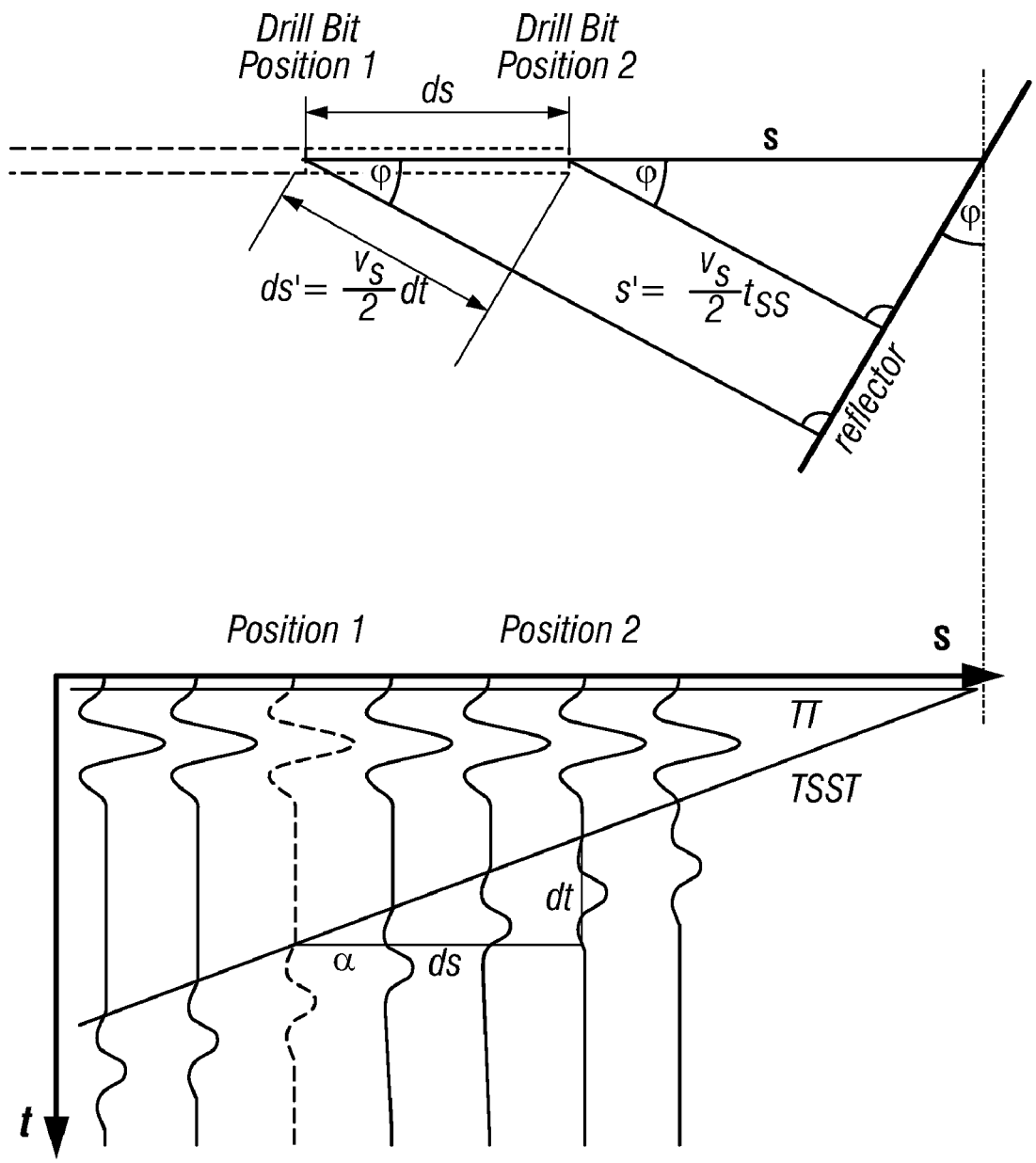
FIG. 15 illustrates how the dip φ of a plane reflector and its distance s' along the borehole axis can be determined.

However, additional information is needed to describe the alignment of the reflector with respect to the borehole, since this distance could be imaged anywhere on a sphere with radius s' around the borehole bottom/conversion point. FIG. 15 illustrates how the dip φ of a plane reflector and its distance s' along the borehole axis can be determined. With the borehole approaching the reflector, the two-way travel time $t_{SS}$ corresponding to the distance s' decreases. This decrease in the travel time $t_{SS}$ expressed by the dip angle α in the according seismogram, is dependent on the dip φ of the reflector. The same holds for the distance s' between borehole and reflector measured along the borehole axis, as can be seen in the following equations:

$$t_{SS} = \frac{2s}{v_S} \cdot \cos\varphi$$

$$\tan\alpha = \frac{dt}{ds} = \frac{2}{v_S} \cdot \cos\varphi$$

$$\varphi = \arccos\left(\frac{v_s}{2}\tan\alpha\right)$$

$$s = \frac{t_{SS}}{\tan\alpha}$$

If seismic measurements are carried out with the borehole bottom/conversion point at different positions, the distance s and the reflector dip φ can be determined. A second angle is needed to describe the alignment of the reflector in relation to the borehole. The second angle is the azimuth θ in relation to the normal of the plane reflector. This direction θ can be determined, for example, by using a source or a combination of sources which is characterized by a particular directivity of the T-S converted waves, so that S-waves with a distinct polarization are radiated only at a desired azimuth range and only TSST-reflections from this azimuth range can be recorded. The same holds for the dip angle φ. Thus it is possible to scan the environment of the borehole and to assign values of dip φ and azimuth θ to a reflector.

Also implemented into the evaluation model (if applicable) is additional information helpful for the evaluation of the measured data. This could be a stratigraphical and velocity model of the subsurface resulting from the surface seismic, nearby well information, LWD/MWD data measured simultaneously to the disclosure's measurement process, etc. Some of this information is implemented before run into the borehole, others are updated/fed in while drilling.

At each measurement level the recorded data are evaluated within the model environment. The evaluation comprises the separation of the primary and the secondary wavefield, the construction of a wellbore velocity model and an ahead-of-the-bit velocity model, as well as the resorting and preconditioning of the data (e.g. filtering). It should be noted that the conversion to an acoustic wave propagating in the formation is not limited to propagation directions directly ahead of the borehole. Consequently, with the use of a transmitter and/or receiver array, there is sufficient aperture to "image" the reflector to determine the reflectors position and dip. The imaging procedure could be any method rearranging the acoustic information elements in a way that reflections and diffractions are plotted on their true locations (e.g. an inversion operation as time or depth migration).

The data evaluation results are used to optimize the source and receiver settings of the next measurement sequence or level (closed loop feedback). Depending on the telemetry bandwidth from downhole to surface, the data evaluation and the closed loop feedback could be performed on the surface or downhole by means of autonomous inversion schemes (this might involve the downhole implementation of artificial intelligence and/or neural networks). The determined boundary location may be used to control the direction of drilling (reservoir navigation). The term "reservoir navigation" includes controlling the direction of drilling to stay at a predetermined distance from a bed boundary and/or to stay at a predetermined distance from a fluid interface that gives rise to the reflection.

The description above has been in terms of a device conveyed on a BHA on a drilling tubular into a borehole in the earth formation. The method and apparatus described above could also be used in conjunction with a logging string conveyed on a wireline into the earth formation. For the purposes of the present disclosure, the BHA and the logging string may be referred to as a "downhole assembly." It should further be noted that while the example shown depicted the transmitter assembly and the receiver assembly on a single tubular, this is not to be construed as a limitation of the disclosure. It is also possible to have a segmented acoustic logging tool to facilitate conveyance in the borehole.

Implicit in the processing of the data is the use of a computer program implemented on a suitable machine readable medium that enables the processor to perform the control and processing. The machine readable medium may include ROMs, EPROMs, EAROMs, Flash Memories and Optical disks. The determined formation velocities and boundary locations may be recorded on a suitable medium and used for subsequent processing upon retrieval of the BHA. The determined formation velocities and boundary locations may further be telemetered uphole for display and analysis.

The foregoing description is directed to particular embodiments of the present disclosure for the purpose of illustration and explanation. It will be apparent, however, to one skilled in the art that many modifications and changes to the embodiment set forth above are possible without departing from the scope and the spirit of the disclosure. It is intended that the following claims be interpreted to embrace all such modifications and changes.

What is claimed is:

1. A method of determining a distance to an interface in an earth formation, the method comprising:
   conveying a logging instrument into a borehole;
   activating at least one transmitter on the logging instrument and producing a guided acoustic wave which propagates downward to a bottom of the borehole and produces an acoustic wave in the earth formation;
   using at least one receiver on the logging instrument for:
   (A) receiving a first signal responsive to the downward propagating guided acoustic wave, and
   (B) receiving a second signal responsive to an upward propagating guided acoustic wave resulting from reflection of the acoustic wave in the formation at the interface therein; and
   using a processor for estimating from the first signal and the second signal a distance to the interface.

2. The method of claim 1 further comprising estimating a dip angle and an azimuth of the interface.

3. The method of claim 1 wherein the guided acoustic wave is selected from the group consisting of: (i) a Stoneley wave, (ii) a quadrupole wave, (iii) a dipole wave, (iv) a tube wave, and (v) a pseudo-Rayleigh wave.

4. The method of claim 1 further comprising activating the at least one transmitter with a frequency determined at least in part by a characteristic frequency of the guided wave.

5. The method of claim 1 wherein the acoustic wave in the formation further comprises a shear wave.

6. The method of claim 1 further comprising activating the transmitter in a mode selected from (i) a monopole mode, and (ii) a quadrupole mode.

7. The method of claim 1 further comprising performing a wavefield separation using the first signal and the second signal.

8. The method of claim 1 further comprising imaging the interface.

9. The method of claim 1 wherein estimating the distance to the interface further comprises applying a dispersion correction to at least one of: (i) the first signal, and (ii) the second signal.

10. The method of claim 1 further comprising controlling a direction of drilling using the determined distance.

11. An apparatus configured to estimate a distance to an interface in an earth formation, the apparatus comprising:
   (a) a logging instrument configured to be conveyed into a borehole;
   (b) at least one transmitter on the logging instrument configured to produce a guided acoustic wave which propagates downward to the bottom of the borehole and produces an acoustic wave in the earth formation;
   (c) at least one receiver configured to:
      (A) receive a first signal responsive to the downward propagating guided acoustic wave, and
      (B) receive a second signal responsive to an upward propagating guided acoustic wave resulting from reflection of the acoustic wave in the formation at the interface therein; and
   (d) at least one processor configured to:
      (C) estimate from the first signal and the second signal a distance from the bottom of the borehole to the interface, and
      (D) record the estimated distance on a suitable medium.

12. The apparatus of claim 11 wherein the at least one processor is further configured to estimate a dip angle and an azimuth of the interface.

13. The apparatus of claim 11 wherein the guided acoustic wave further is selected from the group consisting of: (i) a Stoneley wave, (ii) a quadrupole wave, (iii) a dipole wave, (iv) a tube wave, and (v) a pseudo-Rayleigh wave.

14. The apparatus of claim 11 wherein the at least one transmitter further comprises a plurality of transmitters that are at least one of: (i) axially disposed on the logging instrument, and (ii) circumferentially disposed on the logging instrument.

15. The apparatus of claim 11 wherein the at least one transmitter is further configured to be activated with a frequency determined at least in part by a characteristic frequency of the guided wave.

16. The apparatus of claim 11 wherein the acoustic wave in the formation further comprises a shear wave.

17. The apparatus of claim 11 wherein the at least one processor is further configured to perform a wavefield separation using the first signal and the second signal.

18. The apparatus of claim 11 wherein the at least one processor is further configured to control a direction of drilling using the determined distance.

19. The apparatus of claim 11 further comprising a conveyance device configured to convey a downhole assembly including the logging tool, the conveyance device selected from: (i) a wireline, and (ii) a drillstring.

20. A non-transitory computer-readable medium product having instructions thereon that when read by a processor cause the processor to execute a method, the method comprising:
   estimating a distance to an interface in an earth formation using a first signal indicative of a downward propagating guided acoustic wave in a borehole in the earth formation and a second signal indicative of an upward propagating guided acoustic wave in the borehole resulting from a conversion of the downward propagating guided acoustic wave at the bottom of the borehole into an acoustic wave in the earth formation, a reflection of the acoustic wave in the earth formation at the interface therein, and a conversion of the reflection of the acoustic wave at the bottom of the borehole.

21. The non-transitory computer-readable medium product of claim 20 further comprising at least one of (i) a ROM, (ii) an EAROM, (iii) an EPROM, (iv) an EEPROM, (v) a flash memory, or (vi) an optical disk.

* * * * *